United States Patent Office 3,793,453
Patented Feb. 19, 1974

---

3,793,453
FUNGICIDAL AND BACTERICIDAL COMPOSITION AND METHOD CONTAINING 1-(β-ARYL) ETHYL-IMIDAZOLE KETALS
Erik Fred Godefroi and Jan Heeres, Turnhout, Belgium, assignors to Janssen Pharmaceutica N.V.
No Drawing. Original application Aug. 19, 1968, Ser. No. 753,746, now Patent No. 3,575,999. Divided and this application June 18, 1970, Ser. No. 57,897
Int. Cl. A01n 9/22
U.S. Cl. 424—273
8 Claims

ABSTRACT OF THE DISCLOSURE

A composition and method for combatting bacteria and fungi with 1-(β-aryl) ethyl-imidazole ketals.

---

This invention relates to novel imidazole derivatives and, more particularly, to 1-(β-aryl)ethyl-imidazole ketals having the following formula:

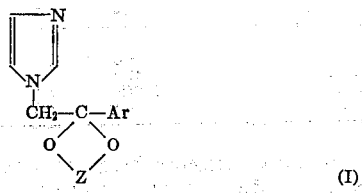

wherein Z is an alkylene selected from the group consisting of

—CH₂CH₂—, —CH₂CH₂CH₂—,
—CH₂—CH(CH₃)— and —CH(CH₃)—CH(CH₃)— and Ar is a member selected from the group consisting of phenyl, halophenyl, dihalophenyl, trihalophenyl lower alkylphenyl, lower alkoxyphenyl, nitrophenyl and 2-thienyl. The therapeutically active acid addition salts of the foregoing compounds (I) are also embraced within the scope of this invention.

This is a divisional application of my co-pending application Ser. No. 753,746, filed Aug. 19, 1968, now U.S. Pat. No. 3,575,999.

As used herein, "lower alkyl" and "lower alkoxy" may be straight or branch chained saturated hydrocarbons having from 1 to about 6 carbons, such as, for example, methyl, ethyl, propyl, isopropyl, butyl, pentyl, hexyl and the like alkyls, and, respectively, the corresponding alkoxys such as methoxy, ethoxy, propoxy, isopropoxy, etc. The preferred lower alkyl and lower alkoxy are methyl and methoxy, respectively. The term "halo" refers to halogens of atomic weight less than 80, i.e., fluoro, bromo and chloro.

The ketals of Formula I are readily obtained by contacting imidazole—previously converted into the form of an alkali metal salt such as, for example, by treatment with an alkali metal alkoxide, preferably, sodium methoxide—with a halide (II) of the formula:

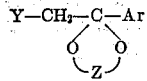

wherein Z and Ar are as previously described and Y is halo, preferably bromo, in a suitable organic solvent, e.g., dimethylformamide or diethylformamide together with a small amount of toluene. The resulting ketal of Formula I is then isolated from the reaction mixture by conventional means, for example, by treating the mixture with water, extracting the ketal product with a suitable organic solvent, preferably an aromatic hydrocarbon such as benzene, and evaporating the solvent from the extract. The foregoing reaction scheme may be further illustrated by the following:

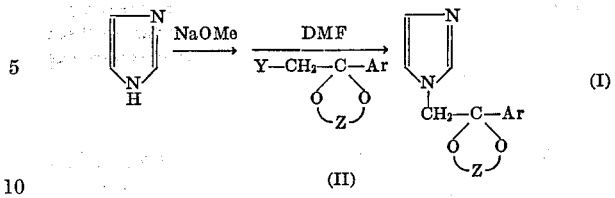

The thus-obtained ketals of Formula I, in base form, may be converted to their therapeutically useful acid addition salts by reaction with an appropriate acid, as, for example, an inorganic acid such as hydrohalic acid, i.e., hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicyclic, p-aminosalicylic, 2-phenoxybenzoic or 2-acetoxy benzoic acid. The salts are in turn converted to the corresponding free bases in the usual manner, e.g., by reaction with alkali such as sodium or potassium hydroxide.

Several of the reactant halides of Formula II have been reported in the literature. Those that are not heretofore known may be easily prepared by first brominating a ketone (III) of the formula: CH₃—CO—Ar, wherein Ar is as previously defined, according to conventional bromination procedures and then reacting the thus obtained bromide (IV) with an appropriate dihydroxy compound (V) of the formula: HO—Z—OH, wherein Z is as previously described, in a suitable organic solvent, e.g., an aromatic hydrocarbon such as benzene, toluene, xylene and the like, to which a small amount of p-toluenesulfonic acid may be added. The following diagrammatic scheme further illustrates the foregoing reactions:

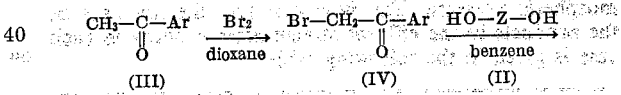

The subject compounds of Formula I and the acid addition salts thereof are useful agents in combating fungi and bacteria as demonstrated by their broad spectrum of anti-fungal and anti-bacterial action. The data given in the following tables illustrate such activity. The method employed in obtaining the tabulated data is that reported by Vanbreuseghem et al., Chemotherapia, 12, 107 (1967).

The tests on fungi were performed using Sabouraud's liquid medium (1 g. of neopeptone Difco and 2 g. of glucose Difco per 100 ml. distilled water) in 16 x 160 mm. test tubes, each containing 4.5 ml. of liquid medium, autoclaved at 120° C. for 15 minutes. The compound to be tested is primarily dissolved in ethanol 50% at a concentration of 20 mg./ml. and afterwards diluted with sterile distilled water in order to obtain a concentration of 10 mg./ml. Successive decimal dilutions were made in distilled water. To each tube, containing 4.5 ml. of Sabouraud's liquid medium, 0.5 ml. of a dilution of the drug was added in order to obtain 1000γ, 500γ, 100γ, 10γ and 1γ per ml. medium (the symbol "γ" equals "micrograms"). A control tube was prepared by adding 0.5 ml. distilled water to 4.5 ml. medium. The concentration of ethanol in the control tubes was the same as in those containing 1000γ and 500γ/ml. of the drug. The filamentous fungi were incubated at 25° C. for two to three weeks. A square block of 2 mm. side was cut and inoculated in the liquid medium. A three day old culture on Sabouraud's liquid medium was used for yeasts. The inoculum was 0.05 ml. per tube. All the cultures were made in duplicate and incubated at 25° C. for 14 days. The first readings were made after 7 days and the final ones after 14 days (the data given in Table I are the final scores observed after 14 days for each compound at the concentration of 100 micrograms per milliliter culture). The score was established assuming a maximum growth for the control tube which was given score 4. The complete absence of growth after 14 days was scored 0, while growths equal to ¼, ½ and ¾ of the controls were rated respectively 1, 2 and 3.

The tests on bacteria were performed on phenol red dextron broth medium (Difco) and on trypton broth medium (Difco) using the same decimal dilution technique as for fungistatic tests (100 γ/ml. and 10 γ/ml.). The inoculum sizes are 0.1 ml. from a 24 hours culture diluted 1/10 in distilled water for *Streptococcus pyogenes* and 0.05 ml. for the other organisms. The results after 72 hours were rated as + or 0, corresponding to the presence or the absence of growth. The data given in Table II hereinafter illustrate such anti-bacterial action.

It is understood that the compounds in the following tables are not listed for purposes of limiting the invention thereto, but only to exemplify the useful properties of all the compounds within the scope of Formula I, including the pharmaceutically acceptable acid addition salts thereof.

In view of the aforementioned anti-fungal and anti-bacterial activities this invention provides valuable compositions comprising the subject ketals (I) or the acid addition salts thereof as the active ingredient in a solvent or a solid, semi-solid or liquid diluent or carrier, and, in addition, it provides an effective method of combatting fungus or bacterial growth by use of an effective anti-fungal or anti-bacterial amount of such ketals (I) or salts thereof. The subject compounds can be used in suitable solvents or diluents, in the form of emulsions, suspensions, dispersions or ointments, on suitable solid or semi-solid carrier substances, in ordinary or synthetic soaps, detergents or dispersion media, if desired, together with other compounds having arachnicidal, insecticidal, ovicidal, fungicidal and/or bactericidal effects, or together with inactive additives.

Solid carrier substances which are suitable for the preparation of compositions in powder form include various inert, porous, and pulverous distributing agents of inorganic or organic nature, such as, for example, tricalcium phosphate, calcium carbonate, in the form of prepared chalk or ground limestone, kaolin, bole, bentonite, talcum, kieselguhr and boric acid; powdered cork, sawdust, and other fine pulverous materials of vegetable origin are also suitable carrier substances.

The active ingredient is mixed with these carrier sub-

TABLE I.—KETAL-DERIVATIVES OF IMIDAZOLE

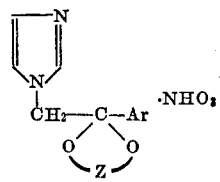

| | | Fungistatic activity (final score at 100 μg./ml.) | | | | | | | | | | |
|---|---|---|---|---|---|---|---|---|---|---|---|
| Z | Ar | 1 | 2 | 3 | 4 | 5 | 6 | 7 | 8 | 9 | 10 | 11 |
| (CH₂)₂ | C₆H₅ | 0 | 0 | 0 | 3 | 4 | 4 | 4 | 4 | 0 | 1 | 1 |
| (CH₂)₂ | 4-Cl—C₆H₄ | 0 | 0 | 0 | 1 | 0 | 1 | 1 | 4 | 0 | 0 | 0 |
| (CH₂)₂ | 4-F—C₆H₄ | 0 | 0 | 0 | 2 | 1 | 2 | 4 | 4 | 0 | 1 | 0 |
| (CH₂)₂ | C₄H₃S ᵃ | 0 | 0 | 0 | 3 | 3 | 3 | 4 | 4 | 1 | 1 | 2 |
| (CH₂)₂ | 3-Cl—C₆H₄ | 0 | 0 | 0 | 1 | 1 | 3 | 3 | 4 | 0 | 0 | 1 |
| (CH₂)₂ | 2-Cl—C₆H₄ | 0 | 0 | 0 | 1 | 0 | 1 | 3 | 4 | 0 | 0 | 0 |
| (CH₂)₂ | 4-OCH₃—C₆H₄ | 0 | 0 | 0 | 4 | 4 | 4 | 4 | 4 | 0 | 3 | 2 |
| (CH₂)₂ | 4-NO₂—C₆H₄ | 0 | 0 | 0 | 4 | 3 | 3 | 3 | 4 | 1 | 3 | 1 |
| (CH₂)₂ | 2-CH₃—C₆H₄ | 0 | 0 | 0 | 0 | 2 | 3 | 3 | 4 | 0 | 0 | 0 |
| (CH₂)₂ | 4-CH₃—C₆H₄ | 0 | 0 | 0 | 2 | 3 | 3 | 3 | 4 | 0 | 0 | 0 |
| (CH₂)₂ | 3-OCH₃—C₆H₄ | 4 | 4 | 4 | 4 | 4 | 4 | 4 | 4 | 4 | 4 | 4 |
| CH₂—CH.CH₃ | 4-Cl—C₆H₄ | 0 | 0 | 0 | 0 | 0 | 0 | 2 | 4 | 0 | 0 | 0 |
| (CH₂)₂ | 2,5-(Cl)₂—C₆H₄ | 0 | 0 | 0 | 1 | 0 | 3 | 2 | 4 | 0 | 0 | 0 |
| (CH₂)₂ | 3-CH₃—C₆H₄ | 0 | 0 | 0 | 2 | 3 | 4 | 4 | 4 | 1 | 2 | 1 |
| (CH₂)₂ | 4-Cl—C₆H₄ | 0 | 0 | 0 | 1 | 0 | 1 | 3 | 4 | 0 | 0 | 0 |
| (CH₂)₂ | 2,3,4-(Cl)₃—C₆H₂ | 0 | 0 | 0 | 0 | 0 | 3 | 0 | 4 | 0 | 0 | 0 |
| (CH₂)₂ | 4-Br—C₆H₄ | 0 | 0 | 0 | 2 | 0 | 1 | 0 | 4 | 0 | 0 | 0 |
| (CH₂)₂ | 2-OCH₃—C₆H₄ | 0 | 0 | 0 | 2 | 3 | 3 | 3 | 4 | 2 | 1 | 1 |
| (CH₂)₃ | 4-F—C₆H₄ | 0 | 0 | 0 | 4 | 3 | 3 | 4 | 4 | 0 | 1 | 0 |
| CH.CH₃—CH.CH₃ | 4-Cl—C₆H₄ | 0 | 0 | 0 | 3 | 0 | 1 | 3 | 4 | 0 | 0 | 1 |

ᵃ Free base. C₄H₃S=2-thienyl.

NOTE.—Headings for columns 1–11 are as follows: 1=*Microsporum canis*; 2=*Trichophyton mentagrophytes*; 3=*Trichophyton rubrum*; 4=*Phialophora verrucosa*; 5=*Cryptococcus neoformans*; 6=*Candida tropicalis*; 7=*Candida albicans*; 8=*Mucor*; 9=*Aspergillus fumigatus*; 10=*Sporotrichum schenckii*; 11=Saprolegnia.

TABLE II

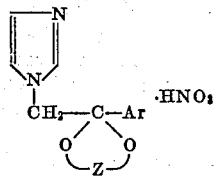

| | | Bacteriostatic activity (final score at 10 μgr./ml.) | | |
|---|---|---|---|---|
| Z | Ar | 1 | 2 | 3 |
| (CH₂)₂ | 2,5-Cl₂—C₆H₃ | 0 | + | 0 |
| CH.CH₃—CH.CH₃ | 4-Cl—C₆H₄ | 0 | + | 0 |

NOTE.—Headings for columns 1–3 are as follows: 1=*Erysipelothrix isidiosa*; 2=*Staphylococcus hemolyticus*; 3=*Streptococcus pyogenes*.

stances, for example, by being ground therewith; alternatively, the inert carrier substance is impregnated with a solution of the active component in a readily volatile solvent and the solvent is thereafter eliminated by heating or by filtering with suction at reduced pressure. By adding wetting and/or dispersing agents, such as pulverous preparations can also be made readily wettable with water, so that suspensions are obtained.

Inert solvents used for the production of liquid preparations should preferably not be readily inflammable and should be as far as possible odorless and as far as possible non-toxic to warm-blooded animals or plants in the relevant surroundings. Solvents suitable for this purpose are high-boiling oils, for example, of vegetable origin, and lower-boiling solvents, with a flash point of at least 30° C., such as, for example, isopropanol, dimethylsulfoxide, hydrogenated naphthalenes and alkylated naphthalenes. It is, of course, also possible to use mixtures of solvents. Solutions can be prepared in the usual way, if necessary, with assistance of solution promoters. Other liquid forms which can be used consist of emulsions or suspensions of the active compound in water or suitable inert solvents, or also concentrates for preparing such emulsions, which can be directly adjusted to the required concentration. For this purpose, the active ingredient is, for example, mixed with a dispersing or emulsifying agent. The active component can also be dissolved or dispersed in a suitable inert solvent and mixed simultaneously or subsequently with a dispersing or emulsifying agent.

It is also possible to use semi-solid carrier substances of a cream ointment, paste or waxlike nature, into which the active component can be incorporated, if necessary, with the aid of solution promoters and/or emulsifiers. Vaseline and other cream bases are examples of semi-solid carrier substances.

Furthermore, it is possible for the active component to be used in the form of aerosols. For this purpose, the active component is dissolved or dispersed, if necessary, with the aid of suitable inert solvents as carrier liquids, such as difluorodichloromethane, which at atmospheric pressure boils at a temperature lower than room temperature, or in other volatile solvents. In this way, solutions under pressure are obtained which, when sprayed, yield aerosols which are particularly suitable for controlling or combating fungi and bacteria, e.g., in closed chambers and storage rooms, and for application to vegetation for eradicating or for preventing infections by fungi or bacteria.

The subject compounds and compositions thereof can be applied by conventional methods. For example, a fungus or bacterial growth or a material to be treated or to be protected against attack by fungus or bacterium can be treated with the subject compounds and the compositions thereof by dusting, sprinkling, spraying, brushing, dipping, smearing, impregnating or other suitable means.

When the subject compounds are employed in combination with suitable carriers, e.g., in solution, suspension, dust, powder, ointment, emulsions, and the like forms, a high activity over a very high range of dilution is observed. For example, concentrations of the active ingredient ranging from 0.1–10 percent by weight, based on the weight of composition employed, have been found effective in combatting fungi or bacteria. Of course, higher concentrations may also be employed as warranted by the particular situation.

The following examples are intended to illustrate, but not to limit, the scope of the present invention. Unless otherwise stated, all parts are by weight.

EXAMPLE I 37.8 parts of methyl-2-thienyl-ketone are brominated with 48 parts of bromine in 48 parts of dioxane and 96 parts of dry ether, while cooling and stirring. The solvent is removed in vacuo. To the residue is added 60 parts of ethylene glycol in 160 parts of toluene and a few crystals of p-toluenesulfonic acid. The whole is stirred and refluxed in an apparatus equipped with a watertrap for 15 hours. The reaction mixture is cooled and the toluene layer is separated, washed once with potassium carbonate solution and once with water, dried, filtered and evaporated in vacuo. The oily residue is distilled in vacuo from potassium carbonate, yielding 2-(bromomethyl) - 2 - (2-thienyl)-1,3-dioxolan; B.P. 95° C. at 0.6 mm. pressure.

EXAMPLE II 46.2 parts of o-chloro-acetophenone are brominated with 48 parts of bromine in 48 parts of dioxane and 96 parts of dry ether, while cooling and stirring. The solvent is removed in vacuo. To the residue is added 60 parts of ethylene glycol in 160 parts of toluene and a few crystals of p-toluene-sulfonic acid. The whole is stirred and refluxed in an apparatus equipped with a water trap for 15 hours. The reaction mixture is cooled and the toluene layer is separated, washed once with potassium carbonate solution and once with water, dried, filtered and evaporated in vacuo. The oily residue is distilled in vacuo from potassium carbonate, yielding 2-(bromomethyl)-2-(o-chlorophenyl)-1,3-dioxolan; B.P. 130° C. at 0.8 mm. pressure.

EXAMPLE III 160 parts of bromine are added portionwise to 133 parts of o-methyl-acetophenone in 250 parts of ethylene glycol at a temperature between 60–80° C. Then there are added 800 parts of benzene and water is distilled of azeotropically (18 hours). The reaction mixture is poured onto diluted sodium hydroxide solution and the product is extracted three times with benzene. The combined organic phases are washed with water, dried, filtered and evaporated in vacuo. The oily residue is distilled, yielding 2-(bromomethyl) - 2 - (o-tolyl)-1,3-dioxolane; B.P. 113–115° C. at 0.8 mm. pressure.

EXAMPLE IV 160 parts of bromine are added portionwise to 133 parts of p-methylacetophenone in 250 parts of ethylene glycol at a temperature between 60–80° C. Then there are added 800 parts of benzene and water is distilled off azeotropically (18 hours). The reaction mixture is poured onto diluted sodium hydroxide solution and the product is extracted with benzene. The extract is dried, filtered and evaporated. The oily residue is distilled, yielding 2-(bromomethyl) - 2 - (p-tolyl)-1,3-dioxolane; B.P. 135–137° C. at 2.5 mm. pressure.

EXAMPLE V

To a cooled (5–10° C.) solution of 150 parts of m-methoxyacetophenone in 320 parts of ether and 200 parts of dioxane are added dropwise 160 parts of bromine. After the addition is complete, 250 parts of ethylene glycol are added and the solvents are removed till an internal temperature of 150° C. is reached. Then 800 parts of benzene are added and water is distilled off azeotropically (18 hours). The reaction mixture is poured onto diluted sodium hydroxide solution and the product is extracted three times with benzene. The combined extracts are washed with water, dried, filtered and evaporated in vacuo. The oily residue is distilled in vacuo, yielding 2 - (bromomethyl)-2-(m-methoxyphenyl)-1,3-dioxolane; B.P. 145–155° C. at 1.4 mm. pressure. After trituration of the distillate in 2-propanol, solid 2-(bromomethyl)-2-(m-methoxyphenyl)-1,3-dioxolane is obtained, which is recrystallized from 2-propanol; M.P. 61° C.

EXAMPLE VI

To a stirred and hot (60–80° C.) solution of 42 parts of 2,5 - dichloro-acetophenone in 70 parts of ethylene glycol are added dropwise 11 parts of bromine. After the addition is complete, there are added 800 parts of benzene and water is distilled off azeotropically (18 hours). The reaction mixture is poured onto diluted sodium hydroxide solution and the product is extracted with benzene. The extract is washed with water, dried, filtered and evaporated in vacuo. The oily residue is distilled, yielding oily 2-(bromomethyl) - 2 - (2,5-dichlorophenyl) - 1,3 - dioxolane; B.P. 143–145° C. at 1 mm. pressure. The distillate is poured onto 80 parts of 2-propanol and, on triturating, the product solidifies. It is filtered off and recrystallized from 2-propanol, yielding 2 - (bromomethyl) - 2 - (2,5 - dichlorophenyl)-1,3-dioxolane; M.P. 61.5° C.

EXAMPLE VII

To a stirred and hot (60–80° C.) solution of 133 parts of m-methylacetophenone in 250 parts of ethylene glycol are added dropwise 160 parts of bromine and the whole is further stirred overnight. The reaction mixture is poured onto diluted sodium hydroxide solution and the product is extracted with benzene. The extract is dried and evaporated in vacuo. The residue is triturated with 400 parts of 2-propanol. The product is filtered off again and recrystallized from 2 - propanol, yielding 2-(bromomethyl)-2-(m-tolyl)-1,3-dioxolane; M.P. 59° C.

EXAMPLE VIII 89.4 parts of 2,3,4 - trichloroacetophenone are brominated with 64 parts of bromine in 96 parts of dioxane and 200 parts of dry ether, while cooling and stirring. The solvent is removed in vacuo. To the residue is added 120 parts of ethylene glycol in 320 parts of toluene and a few crystals of p-toluenesulfonic acid. The whole is stirred and refluxed in an apparatus equipped with a water trap for 15 hours. The reaction mixture is cooled and the toluene layer is separated, washed once and potassium carbonate solution and once with water, dried, filtered and evaporated in vacuo. The oily residue is distilled in vacuo from potassium carbonate, yielding a distillate boiling at 152° C. at 1 mm. pressure. This distillate solidifies on triturating in 2-propanol. The solid product is filtered off and recrystallized from 2-propanol, yielding 2-(bromomethyl)-2-(2,3,4-trichlorophenyl) - 1,3 - dioxolane; M.P. 59.5° C.

EXAMPLE IX

To a stirred and hot (60–80° C.) solution of 150 parts of o-methoxyacetophenone in 250 parts of ethylene glycol are added dropwise 160 parts of bromine and the whole is further stirred overnight. The reaction mixture is poured onto diluted sodium hydroxide solution and the product is extracted with benzene. The extract is dried and evaporated in vacuo. The oily residue solidifies on triturating in 480 parts of 2-propanol. The solid product is filtered off and the mother-liquor is evaporated in vacuo. The combined fractions (solid product and residue) are recrystallized from 2-propanol, to yield 2-(bromomethyl)-2-(o-methoxyphenyl)-1,3-dioxolane; M.P. 99–100° C.

EXAMPLE X

To a stirred and hot (60–80° C.) solution of 155 par of p-chloro-acetophenone in 250 parts of propylene glycol are added dropwise 160 parts of bromine and the whole is further stirred overnight. The reaction mixture is poured onto diluted sodium hydroxide solution and the product is extracted with benzene. The extract is dried and evaporated in vacuo. The oily residue is distilled, yielding 220 parts of oily 2-(bromomethyl)-2-(p-chlorophenyl) - 4 - methyl - 1,3 - dioxolane; B.P. 131–133° C. at 1.25 mm. pressure. On triturating the distillate in 400 parts of 2-propanol while cooling, the oil solidifies. It is filtered off and recrystallized from 2-propanol, yielding 2-(bromomethyl)-2-(p-chlorophenyl)-4-methyl-1,3-dioxolane; M.P. 71° C.

EXAMPLE XI

To a stirred and hot (60–80° C.) solution of 155 parts of p-chloroacetophenone in 250 parts of trimethylene glycol are added dropwise 160 parts of bromine and the whole is further stirred overnight. The reaction mixture is poured onto diluted sodium hydroxide solution and the product is extracted with benzene. The extract is dried and evaporated in vacuo. The oily residue is distilled and the distillate is crystallized on triturating in 560 parts of 2-propanol, to yield a first crude crop. Evaporation of the mother liquor gives an additional crude crop. Both crude fractions are recrystallized from 2-propanol, to yield 2-(bromomethyl) - 2 - (p-chlorophenyl)-m-dioxane; M.P. 75.5° C.

EXAMPLE XII 138 parts of p-fluoroacetophenone are brominated with 160 parts of bromine at a temperature between 75° C. and 80° C., while stirring. Then there are added 400 parts of benzene and a small quantity of p-toluenesulfonic acid and the whole is stirred and refluxed for 15 hours, while water is removed azeotropically by means of a water trap. The benzene layer is separated from the trimethylene glycol phase, washed with potassium carbonate solution, dried, filtered and evaporated in vacuo. The oily residue is distilled, yielding 2-bromomethyl) - 2 - (p-fluorophenyl)-m-dioxane as an oil; B.P. 128° C. at 1 mm. pressure. The distillate solidifies on standing at room temperature. After recrystallization from methanol, solid 2-(bromomethyl)-2-(p-fluorophenyl)-m-dioxane are obtained; M.P. <50° C.

EXAMPLE XIII

To a stirred and hot (60–80° C.) solution of 155 parts of p-chloroacetophenone in 250 parts of 2,3-butanediol are added dropwise 160 parts of bromine and the whole is further stirred overnight. The reaction mixture is poured onto diluted sodium hydroxide solution and the product is extracted with benzene. The extract is dried and evaporated in vacuo. The residue is triturated in 2-propanol and then recrystallized from 2-propanol, yielding 2-(bromomethyl)-2-(p-chlorophenyl)-4,5-dimethyl-1,3 - dioxolane; M.P. 65–66° C.

EXAMPLE XIV

To a sodium methoxide solution, prepared from 6 parts of sodium in 60 parts of absolute methanol, is added a solution of 17 parts of imidazole in 20 parts of absolute methanol. After the addition is complete, 80 parts of the solvent is evaporated off. Then there is added 80 parts of dimethylformamide and again solvent is taken off until an internal temperature of 135° C. is reached. While maintaining this temperature, there is added a solution of 60 parts of 2-bromomethyl-2-phenyl-1,3-dioxolane [described by Feugeas, Cl.: Bull. Soc. Chim. Fr., 1963 (II), p. 2568] in 40 parts of dimethylformamide in a period of 30 minutes. After the addition is complete, the whole is stirred at the same temperature for 3 hours. It is then allowed to come to room temperature and further stirred overnight. The precipitated sodium bromide is filtered off and washed on the filter with benzene. The filtrate is poured onto water. The aqueous phase is separated and extracted with benzene. The extract is dried and evaporated in vacuo. The residue is recrystallized from diisopropylether, yielding 1-[2-(2-phenyl) - 1,3 - dioxolanylmethyl]-imidazole; M.P. 78–81.5° C.

EXAMPLE XV 34.5 parts of sodium are dissolved in 400 parts of methanol, while stirring. Then 320 parts of solvent are evaporated at atmospheric pressure. To the residue are added 500 parts of dimethylformamide. More solvent is removed till an internal temperature of 130° C. is reached. To the residue is added portionwise 277 parts of 2-bromomethyl-2-(p-chlorophenyl) - 1,3 - dioxolane [described by Patel, A. A.: J. Pharm. Sci. 52(6), 588–592 (1963)] at an internal temperature of 140° C. After the addition is complete, stirring is continued for 4 hours at 140–145° C. The reaction mixture is poured onto 2500 parts of ice-water, whereupon the product 1-[2-(p-chlorophenyl)-1,3-dioxolan-2-ylmethyl]imidazole is precipitated. It is filtered off, washed three times with water and then the nitrate salt is prepared in acetone by treatment with excess nitric acid. The precipitated solid salt is filtered off and recrystallized from a mixture of methanol and diisopropylether, yielding 1 - [2-(p-chlorophenyl)-1,3-dioxolan-2-ylmethyl]imidazole nitrate; M.P. 199° C.

EXAMPLE XVI

To a stirred sodium methoxide solution, previously prepared from 34 parts of sodium in 600 parts of methanol, are added 102 parts of imidazole. When all solid is entered into solution, 400 parts of solvent are evaporated at atmospheric pressure. To the residue are added 500 parts of dimethylformamide. Again solvent is removed till internal temperature of 130° C. Then 261 parts of 2-bromomethyl- 2-(p-fluorophenyl)-1,3-dioxolane are added (internal temperature: 140° C.), while stirring. After the addition is complete, the whole is further stirred for 6 hours at 140° C. and then allowed to cool. To the reaction mixture are added 1000 parts of water and the product, 1-[2-(p-fluorophenyl)-1,3-dioxolan-2 - ylmethyl]imidazole, is extracted with methylene dichloride. The extract is washed three times with water, dried, filtered and evaporated in vacuo. The residue is boiled in diisopropyl ether with activated charcoal, filtered and to the filtrate is added an excess of concentrated nitric acid solution. The precipitated nitrate salt is filtered off, triturated in acetone, filtered off again and recrystallized from a mixture of methanol and diisopropylether, yielding 1-[2-(p-fluorophenyl)-1,3-dioxolan-2-ylmethyl]imidazole nitrate; M.P. 187° C.

EXAMPLE XVII

To a stirred and refluxing sodium methoxide solution, previously prepared from 3.4 parts of sodium in 120 parts of methanol, are added 10.2 parts of imidazole. After the addition is complete, 100 parts of solvent are removed at atmospheric pressure. Then 100 parts of dimethylformamide are added and again solvent is removed until an internal temperature of 130° C. is reached. At this temperature there are added 24.9 parts of 2-(bromomethyl)-2-(2-thienyl)-1,3-dioxolan and the whole is stirred for 6 hours at 130–135° C. To the reaction mixture are added 400 parts of water and the product, 1-[2-(2-thienyl)-1,3-dioxolan-2-ylmethyl]imidazole is extracted with methylene chloride. The extract is washed with water, dried, filtered and evaporated in vacuo. The residue is dissolved in acetone and to this solution is added an excess of concentrated nitric acid solution and a small amount of diisopropylether. After cooling on ice, the precipitated solid salt is filtered off and recrystallized from a mixture of methanol and diisopropylether, yielding 1-[2-(2-thienyl)-1,3-dioxolan-2-ylmethyl]imidazole nitrate; M.P. 159° C.

EXAMPLE XVIII

To a stirred and refluxing sodium methoxide solution, previously-prepared from 3.4 parts of sodium in 120 parts of methanol are added 10.2 parts of imidazole. After the addtion is complete, 100 parts of solvent are removed at atmospheric pressure. Then 100 parts of dimethylformamide are added and again solvent is removed until an internal temperature of 130° C. is reached. At this temperature there are added 27.7 parts of 2-bromomethyl-2-(m-chlorophenyl)-1,3-dioxolan and the whole is stirred for 6 hours at 130–135° C. To the reaction mixture are added 400 parts of water and the product is extracted with methylene chloride. The extract is washed with water dried, filtered and evaporated in vacuo. The residue is dissolved in acetone and to this solution is added an excess of concentrated nitric acid solution and a small amount of diisopropylether. After cooling on ice, the precipitated solid salt is filtered off and recrystallized from a mixture of methanol and diisopropylether, yielding 1 - [2 - (m - chlorophenyl) - 1,3 - dioxolan - 2-ylmethyl]-imidazole nitrate; M.P. 171° C.

EXAMPLE XIX

To a stirred and refluxing sodium methoxide solution, previously prepared from 3.4 parts of sodium in 120 parts of methanol, are added 10.2 parts of imidazole. After the addition is complete, 100 parts of solvent are removed at atmospheric pressure. Then 100 parts of dimethylformamide are added and again solvent is removed until an internal temperature of 130° C. is reached. At this temperature there are added 27.7 parts of 2-bromomethyl-2-(o-chlorophenyl)-1,3-dioxolane and the whole is stirred for 6 hours at 130–135° C. To the reaction mixture are added 400 parts of water and the product is extracted with methylene chloride. The extract is washed twice with water, dried, filtered and evaporated in vacuo. The residue is dissolved in acetone and to this solution is added an excess of concentrated nitric acid solution and a small amount of diisopropylether. After cooling on ice, the precipitated solid salt is filtered off and recrystallized from a mixture of methanol and water and a small quantity of diisopropylether, yielding 1-[2-(o-chlorophenyl)-1,3-dioxolan-2-ylmethyl]imidazole nitrate; M.P. 197.5° C.

EXAMPLE XX

To a stirred and refluxing sodium methoxide solution, previously prepared from 3.4 parts of sodium in 120 parts of methanol, are added 10.2 parts of imidazole. After the addition is complete, 100 parts of solvent are removed at atmospheric pressure. Then 100 parts of dimethylformamide are added and again solvent is removed until an internal temperature of 130° C. is reached. At this temperature there are added 24 parts of 2-bromomethyl-2-(p-methoxyphenyl)-1,3-dioxolan and the whole is stirred for 5 hours at 145–150° C. To the reaction mixture are added 400 parts of water and the product is extracted with methylene chloride. The extract is washed twice with water, dried, filtered and evaporated in vacuo. The residue is dissolved in acetone and to this solution is added an excess of concentrated nitric acid solution and a small amount of diisopropylether. After cooling on ice, the precipitated solid salt is filtered off and recrystallized from a mixture of methanol and water and a small quantity of diisopropylether, yielding 1-[2-(p-methoxyphenyl) - 1,3 - dioxolan - 2 - ylmethyl]imidazole nitrate; M.P. 205° C.

EXAMPLE XXI

To a stirred and refluxing sodium methoxide solution, previously prepared from 3.4 parts of sodium in 120 parts of methanol, are added 10.2 parts of imidazole. After the addition is complete, 100 parts of solvent are removed at atmospheric pressure. Then 100 parts of dimethylformamide are added and again solvent is removed until an internal temperature of 130° C. is reached. At this temperature there are added 28.8 parts of 2-bromomethyl-2-(p-nitrophenyl)-1,3-dioxolan and the whole is further stirred for 5 hours at 145–150° C. To the reaction mixture are added 400 parts of water and the product is extracted with methylene chloride. The extract is washed twice with water, dried, filtered and evaporated in vacuo. The residue is dissolved in acetone and to this solution is added an excess of concentrated nitric acid and a small amount of diisopropylether. After cooling on ice, the precipitated solid salt is filtered off and recrystallized from a mixture of methanol and water and a small quantity of diisopropylether, yielding 1 - [2 - (p - nitrophenyl) - 1,3 - dioxolan - 2 - ylmethyl]imidazole nitrate; M.P. 186.5° C.

EXAMPLE XXII

To a sodium methoxide solution, previously prepared from 2.6 parts of sodium in 100 parts of methanol, are added 7.7 parts of imidazole. After the addition is complete, 80 parts of solvent are evaporated in vacuo. Then 100 parts of dimethylformamide are added and again solvent is evaporated till a temperature of 125 C. is reached. Then 19.2 parts of 2-bromomethyl-2-o-tolyl-1,3-dioxolan are added and 8 parts of toluene and the whole is stirred and refluxed for 4 hours. The reaction mixture is poured onto water and the product is extracted three times with benzene. The extracts are dried and evaporated in vacuo. From the residue, the nitrate salt is prepared in the usual manner in diisopropylether, yielding, after recrystallization of the crude solid salt from 60 parts of ethanol, 1-(2-o-tolyl - 1,3-dioxolan-2-ylmethyl)-imidazole nitrate; M.P. 198.5° C.

EXAMPLE XXIII

To a sodium methoxide solution, previously prepared from 2.6 parts of sodium in 100 parts of methanol, are added 7.7 parts of imidazole. After the addition is complete, 80 parts of solvent are evaporated in vacuo. Then 100 parts of dimethylformamide are added and again solvent is removed until a temperature of 125° C. is reached. At this temperature, 19.2 parts of 2-(bromomethyl)-2-p-tolyl-1,3-dioxolane are added and 8 parts of toluene and the whole is stirred and refluxed for 4 hours. The reaction mixture is poured onto water and the product is extracted three times with benzene. The combined extracts are dried and evaporated in vacuo. From the residue, the nitrate salt is prepared in the usual manner in diisopropylether, yielding after recrystallization of the crude solid salt from a mixture of ethanol and diisopropylether, 1 - (2 - p - tolyl - 1,3-dioxolan-2-ylmethyl)imidazole nitrate; M.P. 182.5° C.

EXAMPLE XXIV

To a sodium methoxide solution, previously prepared from 2.6 parts of sodium in 100 parts of methanol, are added 7.7 parts of imidazole. After the addition is complete, 80 parts of solvent are evaporated in vacuo. Then 100 parts of dimethylformamide are added and again solvent is removed until a temperature of 125° C. At this temperature, 20.5 parts of 2-(bromomethyl)-2-(m-methoxyphenyl) 1,3-dioxolane are added together with 8 parts of toluene and the whole is stirred and refluxed for 4 hours. The reaction mixture is poured onto water and the product is extracted three times with benzene. The combined extracts are dried and evaporated in vacuo. From the residue, the nitrate salt is prepared in the usual manner is diisopropylether. The crude solid salt is filtered off and recrystallized from a mixture of ethanol and diisopropylether, yielding 1 - [2 - (m - methoxyphenyl) - 1,3-dioxolan-2-ylmethyl]imidazole nitrate; M.P. 160° C.

EXAMPLE XXV

To a sodium methoxide solution, previously prepared from 2.6 parts of sodium in 100 parts of methanol, are added 7.7 parts of imidazole. After the addition is complete, 80 parts of solvent is evaporated in vacuo. Then 100 parts of dimethylformamide are added and again solvent is removed until a temperature of 125° C. is reached. Then there are added 22 parts of 2-(bromomethyl)-2-(p-chlorophenyl)-4-methyl-1,3-dioxolane, and 8 parts of toluene and the whole is stirred and refluxed for 4 hours. The reaction mixture is poured onto water and the product is extracted three times with benzene. The combined extracts are dried and evaporated in vacuo. From the oily residue, the nitrate salt is prepared in the usual manner in diisopropylether. The crude solid salt is filtered off and recrystallized from a mixture of ethanol and diisopropylether, yielding 1-[2-(p-chlorophenyl)-4-methyl-1,3-dioxolan - 2-ylmethyl]imidazole nitrate; M.P. 189° C.

EXAMPLE XXVI

To a sodium methoxide solution, previously prepared from 2.6 parts of sodium in 100 parts of methanol, are added 7.7 parts of imidazole. After the addition is complete, 80 parts of solvent are removed. Then 100 parts of dimethylformamide are added and again solvent is evaporated in vacuo until a temperature of 125° C. is reached. Then there are added 23.5 parts of 2-(bromomethyl)-2-(2,5-dichlorophenyl)-1,3-dioxolane and 8 parts of toluene and the whole is stirred and refluxed for 4 hours. The reaction mixture is poured onto water and the product is extracted three times with benzene. The combined extracts are dried and evaporated in vacuo. From the residue, the nitrate salt is prepared in the usual manner in diisopropylether. The crude solid salt is filtered off and recrystallized from ethanol, yielding 1-[2-(2,5-dichlorophenyl)-1,3-dioxolan-2-ylmethyl]imidazole nitrate; M.P. 186° C.

EXAMPLE XXVII

To a sodium methoxide solution, previously prepared from 2.75 parts of sodium in 100 parts of methanol, are added 8.2 parts of imidazole. After the addition is complete, 80 parts of solvent are evaporated in vacuo. Then 100 parts of dimethylformamide are added and again solvent is removed until the internal temperature reached is 125° C. Then there are added 25.7 parts of 2-(bromomethyl)-2-m-tolyl-1,3-dioxolane and 8 parts of toluene and the whole is stirred and refluxed for 4 hours. The reaction mixture is poured onto water and the product is extracted three times with benzene. The combined extracts are dried and evaporated in vacuo. From the oily residue, the nitrate salt is prepared in the usual manner in diisopropylether. The crude salt is filtered off and recrystallized from a mixture of ethanol, acetone and diisopropylether (24, 40 and 80 parts respectively), yielding 1-(2-m-tolyl - 1,3-dioxolan-2-ylmethyl)imidazole nitrate; M.P. 160° C.

EXAMPLE XXVIII

To a sodium methoxide solution, previously prepared from 2.75 parts of sodium in 100 parts of methanol, are added 8.2 parts of imidazole. After the addition is complete, 80 parts of solvent are evaporated in vacuo. Then 100 parts of dimethylformamide are added and again solvent is removed until the internal temperature reaches 125° C. Then there are added 29.1 parts of 2-(bromomethyl)-2-(p-chlorophenyl)-m-dioxane and 8 parts of toluene and the whole is stirred and refluxed for 4 hours. The reaction mixture is poured onto water and the product is extracted three times with benzene. The combined extracts are dried and evaporated in vacuo. From the residual oily free base, the nitrate salt is prepared in the usual manner in diisopropylether. The crude salt is filtered off and recrystallized from a mixture of 25 parts of ethanol, 40 parts of acetone and 80 parts of diisopropylether, yielding 1-[2-(p-chlorophenyl)-m-dioxan-2-ylmethyl]imidazole nitrate; M.P. 197.5° C.

EXAMPLE XXIX

To a stirred and refluxing sodium methoxide solution, previously prepared from 1.7 parts of sodium in 80 parts of methanol, are added 5.1 parts of imidazole. After the addition is complete, 100 parts of solvent are evaporated at atmospheric pressure. Then 100 parts of dimethylformamide are added and again solvent is removed until internal temperature of 130° C. At this temperature there are added 17.3 parts of 2-(bromomethyl)-2-(2,3,4-tri-chlorophenyl)-1,3-dioxolane and the whole is stirred for 5 hours at 145–150° C. To the reaction mixture are added 400 parts of water and the product is extracted with methylene chloride. The extract is dried, filtered and evaporated in vacuo. The residual oily free base is dissolved in acetone and to this solution is added successively an excess of concentrated nitric acid solution and a small amount of diisopropylether. The precipitated solid salt is filtered off and recrystallized from ethanol, yielding 1-[2-(2,3,4-trichlorophenyl)-1,3-dioxolan-2-ylmethyl]imidazole nitrate; M.P. 196° C.

EXAMPLE XXX

To a stirred and refluxing sodium methoxide solution, previously prepared from 3,4 parts of sodium in 80 parts of methanol, are added 10.2 parts of imidazole. After the addition is complete, 100 parts of solvent is evaporated at atmospheric pressure. Then 100 parts of dimethylformamide are added and again solvent is removed until an internal temperature of 130° C. is reached. At this temperature there are added 32.2 parts of 2-(bromomethyl)-2-(p-bromophenyl)-1,3-dioxolane and the whole is stirred for 5 hours at 145–150° C. To the reaction mixture are added 400 parts of water and the product is extracted with methylene chloride. The extract is washed with water, dried, filtered and evaporated in vacuo. The residual oily free base is dissolved in acetone and to this solution is added successively an excess of concentrated nitric acid solution and a small amount of diisopropylether. The precipitated solid salt is filtered off and recrystallized from a mixture of methanol and diisopropylether, yielding 1-[2-(p - bromophenyl)-1,3-dioxolan-2-ylmethyl]imidazole nitrate; M.P. 208° C.

EXAMPLE XXXI

To a sodium methoxide solution, previously prepared from 2.75 parts of sodium in 100 parts of methanol, are added 8.2 parts of imidazole. After the addition is complete, 80 parts of solvent are evaporated in vacuo. Then 100 parts of dimethylformamide are added and again solvent is removed until a temperature of 125° C. is reached. Then there are added 27.3 parts of 2-(bromomethyl)-2-(o-methoxyphenyl)-1,3-dioxolane and 8 parts of toluene and the whole is stirred and refluxed for 4 hours. The reaction mixture is poured onto water and the product is extracted three times with benzene. The combined extracts are dried and evaporated in vacuo. From the residual oily free base, the nitrate salt is prepared in the usual manner in diisopropylether. The crude solid salt is filtered off and recrystallized from a mixture of 24 parts of 2-propanol, 64 parts of acetone and 80 parts of diisopropylether, to yield 1-[2-(o-methoxyphenyl) 1,3-dioxolan-2-ylmethyl]imidazole nitrate; M.P. 158.5° C.

EXAMPLE XXXII

To a stirred and refluxing sodium methoxide solution previously prepared from 3.4 parts of sodium in 120 parts of methanol, are added 10.2 parts of imidazole. After the addition is complete, 100 parts of solvent are evaporated at atmospheric pressure. Then 100 parts of dimethylformamide are added and again solvent is removed until an internal temperature of 130° C. is reached. At this temperature, there are added 27.5 parts of 2-(bromomethyl)-2-(p-fluorophenyl)-m-dioxane and the whole is stirred for 5 hours at 145–150° C. To the reaction mixture are added 400 parts of water and the product is extracted with methylene chloride. The extract is washed with water, dried, filtered and evaporated in vacuo. The residue is dissolved in acetone and to this solution is added an excess of concentrated nitric acid solution and a small amount of diisopropylether. The precipitated solid salt is filtered off and recrystallized from water, yielding 1-[2-(p-fluorophenyl)-m-dioxan-2-ylmethyl]imidazole nitrate; M.P. 188° C.

EXAMPLE XXXIII

To a sodium methoxide solution, previously prepared from 2.6 parts of sodium in 100 parts of methanol, are added 7.7 parts of imidazole. Then 80 parts of methanol are removed and 80 parts of dimethylformamide are added. Solvent is taken off till internal temperature of 125° C. To the resulting imidazole sodium salt are added successively 23 parts of 2-(bromomethyl)-2-(p-chlorophenyl)-4,5-dimethyl-1,3-dioxolane and 8 parts of toluene and the whole is stirred and refluxed for 4 hours. The reaction mixture is poured onto water and the product is extracted three times with benzene. The combined extracts are washed twice with water, dried and evaporated in vacuo. From the residue, the nitrate salt is prepared in the usual manner, yielding, after recrystallization of the crude salt from a mixture of ethanol, acetone and diisopropylether, 1 - [2 - (p-chlorophenyl)-4,5-dimethyl-1,3-dioxolan-2-ylmethyl]imidazole nitrate; M.P. 187.5° C.

EXAMPLE XXXIV (A) The procedure set forth in Example X may be utilized to prepare those compounds of Formula II wherein Z is —CH₂—CH(CH₃)—. Accordingly, by substituting therein an equivalent quantity of an appropriate ketone of the formula CH₃—CO—Ar as starting material, the following are obtained, respectively:

2-(bromomethyl)-2-phenyl-4-methyl-1,3-dioxolane;
2-(bromomethyl)-2-(p-methylphenyl)-4-methyl-1,3-dioxolane;
2-(bromomethyl)-2-(p-methoxyphenyl)-4-methyl-1,3-dioxolane;
2-(bromomethyl)-2-(2,5-dichlorophenyl)-4-methyl-1,3-dioxolane;
2-(bromomethyl)-2-(2,5-trichlorophenyl)-4-methyl-1,3-dioxolane;
2-(bromomethyl)-2-(p-nitrophenyl)-4-methyl-1,3-dioxolane; and
2-(bromomethyl)-2-(2-thienyl)-4-methyl-1,3-dioxolane.

(B) By repeating the procedure of Example XXV, except that an equivalent quantity each of the dioxolanes obtained from Example XXXIV–(A) are substituted therein as starting material, the corresponding respective ketals of Formula I are obtained, in the form of a nitrate salt, with Z equal to —CH₂—CH(CH₃)—.

EXAMPLE XXXV (A) The procedure set forth in Example XI may be utilized to prepare those compounds of Formula II wherein Z is —CH₂CH₂CH₂—. Accordingly, by substituting therein an equivalent quantity of an appropriate ketone of the formula CH₃—CO—Ar as starting material, the following are obtained, respectively:

2-(bromomethyl)-2-phenyl-m-dioxane;
2-(bromomethyl)-2-(o-methylphenyl)-m-dioxane;
2-(bromomethyl)-2-(p-methoxyphenyl)-m-dioxane;
2-(bromomethyl)-2-(2,5-dichlorophenyl)-m-dioxane;
2-(bromomethyl)-2-(2,3,4-trichlorophenyl)-m-dioxane;
2-(bromomethyl)-2-(p-nitrophenyl)-m-dioxane; and
2-(bromomethyl)-2-(2-thienyl)-m-dioxane.

(B) By repeating the procedure of Example XXVIII, except that an equivalent quantity each of the dioxanes obtained from Example XXXV–(A) is substituted therein as starting material, the corresponding respective ketals of Formula I are obtained, in the form of a nitrate salt, with Z equal to —CH₂CH₂CH₂—.

EXAMPLE XXXVI (A) The procedure set forth in Example XIII may be utilized to prepare those compounds of Formula II wherein Z is —CH(CH₃)—CH(CH₃)—. Accordingly, by substituting therein an equivalent quantity of an appropriate ketone of the formula CH₃—CO—Ar as starting material, the following are obtained, respectively:

2-(bromomethyl)-2-phenyl-4,5-dimethyl-1,3-dioxolane;
2-(bromomethyl)-2-(p-methylphenyl)-4,5-dimethyl-1,3-dioxolane;
2-(bromomethyl)-2-(o-methoxyphenyl)-4,5-dimethyl-1,3-dioxolane;
2-(bromomethyl)-2-(2,5-dichlorophenyl)-4,5-dimethyl-1,3-dioxolane;
2-(bromomethyl)-2-(2,3,4-trichlorophenyl)-4,5-dimethyl-1,3-dioxolane;
2-(bromomethyl)-2-(p-nitrophenyl)-4,5-dimethyl-1,3-dioxolane, and
2-(bromomethyl)-2-(2-thienyl)-4,5-dimethyl-1,3-dioxolane.

(B) The procedure of Example XXXIII is repeated, except that an equivalent quantity each of the dioxolanes obtained from Example XXXVI is substituted therein as starting material, the corresponding respective ketals of Formula I are obtained, in the form of a nitrate salt, with Z equal to —CH(CH₃)—CH(CH₃)—.

EXAMPLE XXXVII

The compositions according to this invention are employed in those forms which are customarily used for fungus or bacteria control, for example, as suspensions, dusting powders, solutions, ointments and the like. The following will further illustrate the invention, the parts being parts by weight unless otherwise specified:

(1) Dusting powder.—20 parts of 1-[2-(p-chlorophenyl)-4,5-dimethyl-1,3-dioxolan - 2 - ylmethyl]imidazole are ground with 360 parts of talcum in a ball mill, then 8 parts of olein are added and grinding is continued, and finally the mixture is mixed with 4 parts of slaked lime. The powder which is formed can be sprayed satisfactorily and has good adhesive power. It can be used for dusting or for plant protection purposes.

(2) Solution.—5 parts of 1-[2-(o-methoxyphenyl)-1,3-dioxolan-2-ylmethyl]imidazole are dissolved in 95 parts of alkylated naphthalene and used as a spray for the treatment of fungus-infected subjects or on walls, floors, or other objects to prevent infection by fungi.

(3) Ointment.—10 parts of 1-[2-(2,3,4-trichlorophenyl)-1,3-dioxolan-2-ylmethyl]imidazole are dissolved in a warm, liquefied mixture of 400 parts of polyethylene glycol 400 and 590 parts of polyethylene glycol 1500. The solution is stirred during cooling, and used as an ointment for treatment against fungi and bacteria.

What is claimed is:

1. A composition for combatting a micro-organism selected from the group consisting of fungus and bacterium comprising an inert carrier and as an active ingredient an effective anti-fungal or anti-bacterial amount of a chemical compound selected from the group consisting of a 1-(β-aryl)ethyl-imidazole ketal of the formula:

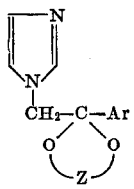

and the pharmaceutically acceptable acid addition salts thereof wherein Z is an alkylene selected from the group consisting of

—CH$_2$CH$_2$—, —CH$_2$CH$_2$CH$_2$—, —CH$_2$—CH(CH$_3$)— and

—CH(CH$_3$)—CH(CH$_3$)— and Ar is a member selected from the group consisting of phenyl, halophenyl, dihalophenyl, trihalophenyl, lower alkylphenyl, lower alkoxyphenyl, nitrophenyl and 2-thienyl.

2. A composition for combatting a micro-organism selected from the group consisting of fungus and bacterium comprising an inert carrier and as an active ingredient an effective anti-fungal or anti-bacterial amount of a chemical compound selected from the group consisting of a 1-(β-aryl)ethyl-imidazole ketal of the formula:

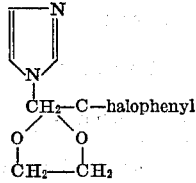

and the pharmaceutically acceptable acid addition salts thereof.

3. A composition for combatting a micro-organism selected from the group consisting of fungus and bacterium comprising an inert carrier and as an active ingredient an effective anti-fungal or anti-bacterial amount of a chemical compound selected from the group consisting of 1-[2-(o-methoxyphenyl)-1,3-dioxolan-2-ylmethyl]imidazole and the pharmaceutically acceptable acid addition salts thereof.

4. A composition for combatting a micro-organism selected from the group consisting of fungus and bacterium comprising an inert carrier and as an active ingredient an effective anti-fungal or anti-bacterial amount of a chemical compound selected from the group consisting of 1-[2-(2,3,4-trichlorophenyl)-1,3-dioxolan-2-ylmethyl]imidazole and the pharmaceutically acceptable acid addition salts thereof.

5. The method of combatting a micro-organism selected from the group consisting of fungus and bacterium which comprises applying to said micro-organism or to a material to be treated or to be protected against attack by said micro-organism an effective anti-fungal or anti-bacterial amount of a chemical compound selected from the group consisting of 1-(β-aryl)ethyl-imidazole ketal of the formula:

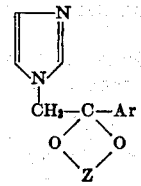

and the pharmaceutically acceptable acid addition salts thereof wherein Z is an alkylene selected from the group consisting of

—CH$_2$CH$_2$—, —CH$_2$CH$_2$CH$_2$—, —CH$_2$CH(CH$_3$)— and

—CH(CH$_3$)—CH(CH$_3$)— and Ar is a member selected from the group consisting of phenyl, halophenyl, dihalophenyl, trihalophenyl, lower alkylphenyl, lower alkoxyphenyl, nitrophenyl and 2-thienyl.

6. The method of combatting a micro-organism selected from the group consisting of fungus and bacterium which comprises applying to said micro-organism or to a material to be treated or to be protected against attack by said micro-organism an effective anti-fungal or anti-bacterial amount of a chemical compound selected from the group consisting of 1-(β-aryl)ethyl-imidazole ketal of the formula:

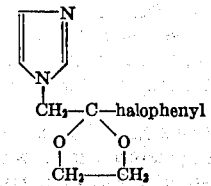

and the pharmaceutically acceptable acid addition salts thereof.

7. The method of combatting a micro-organism selected from the group consisting of fungus and bacterium which comprises applying to said micro-organism or to a material to be treated or to be protected against attack by said micro-organism an effective anti-fungal or anti-bacterial amount of a chemical compound selected from the group consisting of a 1-[2-(o-methoxyphenyl)-1,3-dioxolan-2-ylmethyl] imidazole and the pharmaceutically acceptable acid addition salts thereof.

8. The method of combatting a micro-organism selected from the group consisting of fungus and bacterium which comprises applying to said micro-organism or to a material to be treated or to be protected against attack by said micro-organism an effective anti-fungal or anti-bacterial amount of a chemical compound selected from the group consisting of 1-[2-(2,3,4-trichlorophenyl)-1,3-dioxolan-2-ylmethyl] imidazole and the pharmaceutically acceptable acid addition salts thereof.

References Cited
FOREIGN PATENTS
1,486,817   5/1967   France _____ 260—309

ALBERT T. MEYERS, Primary Examiner

D. R. ORE, Assistant Examiner

U.S. Cl. X.R.

252—106, 107; 424—46, 357

UNITED STATES PATENT OFFICE
CERTIFICATE OF CORRECTION

Patent No. 3,793,453          Dated February 19, 1974

Inventor(s) Erik Fred Godefroi and Jan Heeres

It is certified that error appears in the above-identified patent and that said Letters Patent are hereby corrected as shown below:

In Column 3, Table 1, line 13 in 2nd Column: should read --- $2,5-(Cl)_2-C_6H_3$ In Column 6, line 16, "of" should read --- off ---.

In Column 7, line 44, "par" should read --- parts ---.

In Column 8, line 55, "Patel,A.A." should read --- Patel, A.R. ---.

In Column 10, line 59, "125 C" should read --- 125°C ---.

In Column 11, line 24, "thoxyphenyl) 1,3-dioxolane" should read --- thoxyphenyl)-1,3-dioxolane ---.

In Column 12, line 4, "vnet" should read --- vent ---.

In Column 12, line 33, "25 parts" should read --- 24 parts ---.

In Column 12, line 61, "3,4 parts" should read --- 3.4 parts ---.

In Column 13, line 23, "1,3-" should read --- -1,3- ---.

Signed and sealed this 20th day of May 1975.

(SEAL)
Attest:

RUTH C. MASON
Attesting Officer

C. MARSHALL DANN
Commissioner of Patents
and Trademarks